United States Patent [19]

Higman et al.

[11] Patent Number: 5,676,514

[45] Date of Patent: Oct. 14, 1997

[54] TROLLEY CAR FOR MATERIAL HANDLING TRAIN

[75] Inventors: Gordon L. Higman, Dexter; John Strand; James J. Gould, both of Ann Arbor; Chris D. Erickson, Saline, all of Mich.

[73] Assignee: Symorex, Ltd., Ann Arbor, Mich.

[21] Appl. No.: 524,399

[22] Filed: Sep. 6, 1995

Related U.S. Application Data

[63] Continuation-in-part of Ser. No. 176,383, Jan. 3, 1994.

[51] Int. Cl.⁶ .................................................. B65G 47/46
[52] U.S. Cl. ...................... 414/339; 198/370.04; 198/349
[58] Field of Search ........................... 198/341, 349, 198/349.5, 349.6, 350, 370.04; 414/222, 339, 349; 209/698, 912

[56] References Cited

U.S. PATENT DOCUMENTS

| | | | |
|---|---|---|---|
| 3,167,192 | 1/1965 | Harrison et al. | 214/62 |
| 3,510,014 | 5/1970 | Speaker et al. | 214/62 |
| 3,662,872 | 5/1972 | Muller | 198/370.04 |
| 3,803,556 | 4/1974 | Duffy | 198/349 |
| 4,063,656 | 12/1977 | Lambert | 214/62 A |
| 4,635,785 | 1/1987 | Prydtz | 198/370.04 |
| 4,722,430 | 2/1988 | Canziani | 198/370.04 |
| 4,921,087 | 5/1990 | Nakamura | 198/350 |
| 5,018,928 | 5/1991 | Hartlepp | 414/339 |
| 5,325,972 | 7/1994 | Prydtz et al. | 198/349.6 |

OTHER PUBLICATIONS

"Nova Sort–Engineered to Meet Your Needs" by Amphion, Inc., 1991 (4 pgs.).
"This is not Your Father's Material Handling System" Production/Dec., 1993, by Gary S. Vasilash (pp. 52–53).
"Trains of trays: a new approach to conveying", Modern Materials Handling Aug. 1991 (p. 85).
"Sortation Conveyor" by Industrial Equipment News, Nov. 1991 (1 pg.).

*Primary Examiner*—Joseph E. Valenza
*Attorney, Agent, or Firm*—Young & Basile, P.C.

[57] ABSTRACT

An automated material handling system utilizing one or more train-type guided vehicles moving along a rail with each train including a locomotive pulling a plurality of trolleys. Each trolley includes a tiltable tray, an onboard CPU, and onboard sensors for sensing information with respect to the product being carried by the tray. The sensed information is transmitted to the CPU of the trolley where it is stored and also transmitted to a CPU in the locomotive. The locomotive CPU is in radio frequency contact with an off-track dispatch computer controlling the overall operation of the material handling system. The CPU of each trolley is also in infrared communication with local CPU's positioned at unloading stations so that the CPU on each car may receive information by infrared transmission from local CPU's, information generated onboard by the onboard sensors, and command information from the locomotive CPU. The information sensed onboard may include the disposition of the tray, the presence or absence of a product load on the tray, and the size, position, orientation, weight, identification, and temperature of the product load. The system includes a shift mechanism for moving the tray between a left tilt position and a right tilt position to facilitate loading, transport and unloading of a product from the trolleys.

32 Claims, 6 Drawing Sheets

TROLLEY CAR FOR MATERIAL HANDLING TRAIN

RELATED APPLICATION

This application is a continuation-in-part of U.S. patent application Ser. No. 08/176,383 filed on Jan. 3, 1994 and entitled "Method and Apparatus for Centralized Mechanical Systems Control in a Material Handling System."

FIELD OF THE INVENTION

The invention is generally related to automated material handling systems utilizing one or more train-type guided vehicles transporting goods between induction and discharge stations in a sortation system.

BACKGROUND OF THE INVENTION

Automated material handling and sortation systems are known for receiving, transporting and discharging goods among various stations in large scale sortation operations such, for example, as warehousing, distribution, postal sortation and handling of mail and packages, and airport baggage handling. Whatever the operation, goods typically originate from one location within the facility and must be sorted and transported to several different locations for further handling, or originate from several locations within a facility and must be transported to a single location such as a shipping dock. The manner in which the various goods are stored and selectively distributed among various stations in a facility of course depends on the nature of the operation.

One known sortation and delivery method involves using powered belt or roller conveyers to transport individual items or sorted loads of items to various destinations within a facility. When goods from multiple sources must be delivered to a single station, associated take away conveyors must be merged onto a main conveyor or discharge point. This requires careful coordination of each item as it arrives to prevent jams or damage. Each merge point on such a conveyor system accordingly requires a complex system of sensors, start/stop controls, actuators, power supply lines, etc. Similarly, when items must be delivered to multiple destinations or stations in a facility, a main conveyor must be provided with diverter apparatus to direct individual items or batches of items to either continue or be diverted at various points. Each diverter apparatus requires an additional closed system including sensors, actuators, control mechanisms, wiring and power supply to accomplish the diverting operation and track and identify the items being diverted.

The disadvantages of conveyor-type systems have led to the development of tracked systems in which a closed loop track carries cars propelled by a continuous chain drive. The cars are equipped with open trays which can be loaded from belts or chutes, and subsequently tilted to unload their carloads into bins which are located around the track. Such systems are designed for long term installations which sort and transport large volumes of goods. Although these closed loop track systems are an improvement over conveyor-type systems, the complexity of their track, drive and tilting mechanisms makes it a major undertaking to set them up or rearrange their sortation layout. Further, they must be shut down for nearly all maintenance tasks.

An improvement over continuous belt or chain drive closed loop track systems is disclosed in U.S. Pat. No. 5,018,928 issued to Hartlepp and assigned to the assignee of the present invention. Hartlepp discloses a train-type automated track sortation system, including a number of trolley cars and a locomotive or tug for pulling the cars around the track between various discharge and induction stations. The cars on the train are loaded with goods to be sorted or delivered and given destination addresses for the goods at an induction or loading station. Once a train has left the loading station, functions such as keeping track of position, regulating speed and dumping cars are controlled by a microprocessor placed aboard each locomotive.

Although train-type automated track sortation systems of the type disclosed by Hartlepp represent an improvement over conveyor-type and belt or chain-driven track systems, there is need for an improved trolley car. Prior art trolley cars have been generally "dumb" in the sense that they are dependent on intelligence provided by either the pulling locomotive or an off-track facility. Whereas "dumb" cars are satisfactory for most material handling purposes, there are distinct limitations on the material handling tasks that can be efficiently performed utilizing cars lacking on-board intelligence.

SUMMARY OF THE INVENTION

This invention is directed to the provision of an improved trolley car for a material handling train.

More specifically, this invention is directed to the provision of an improved material handling system incorporating the improved trolley car.

The invention is further directed to the provision of an improved mechanism for moving the tiltable tray of a tray trolley between its various positions.

This invention relates to a material handling system including a rail; a locomotive mounted for powered movement along the rail; and one or more trolley cars arranged to be pulled along the rail by the locomotive and each including an upper load support surface for use in selectively receiving, transporting, and discharging discrete products with respect to various stations along the rail.

According to the invention, a CPU is provided and sensor means are provided on each car which are operative to sense information with respect to the products on the load support surface of that car and transmit the sensed information to the CPU for storage and utilization by the CPU in controlling the load support surface to facilitate the receipt, transport and discharge of the products. This arrangement enables each trolley car to utilize information sensed with respect to products on the load support surface of the car and use this information in the handling of the products.

According to a further feature of the invention, each trolley car includes a CPU and the information sensed with respect to the products on the load support surface of each car is transmitted to the CPU of that car. This arrangement allows each trolley car to both sense and process information with respect to products on the load support surface of the car.

According to a further feature of the invention, the locomotive includes a CPU and the sensed information stored in each trolley car CPU is transmitted to the locomotive CPU for storage and utilization by the locomotive CPU software in the receipt, transport and discharge of the products. This arrangement allows the CPU on board each trolley car to either use the sensed and stored information with respect to the products on the load support surface of that car directly in the control of the handling of these products and/or transmit this information to the locomotive CPU for use by the locomotive CPU in controlling the product handling.

According to a further feature of the invention, the system further includes a central dispatch CPU located off-track and controlling the overall operation of the material handling system, and the locomotive CPU communicates with the dispatch CPU and operates to transmit information received from the trolley CPUs to the dispatch CPU for utilization by the dispatch CPU in controlling the overall operation of the material handling system. This arrangement provides a total control system in which the sensed information on each trolley may be utilized directly by the CPU of that trolley, may be transmitted to the locomotive CPU for use by the locomotive CPU in controlling the handling of the products, or may be transmitted by the locomotive CPU to the dispatch CPU for use by the dispatch CPU in controlling the overall handling of the products by the system.

According to a further feature of the invention, the communication between the locomotive CPU and the dispatch CPU is by radio frequency. This arrangement obviates the need for a hard wire connection between the locomotive CPU and the dispatch CPU.

The information sensed by the sensor means includes a wide variety of information with respect to the product being handled including information with respect to the disposition of the load support surface; information with respect to the presence or absence of a product load on the load support surface; information with respect to the size, position or orientation of a product load on the load support surface; information with respect to the weight of a product load on the load support surface; information with respect to the identification of a product load on the load support surface; or information with respect to the temperature of a product load on the load support surface.

According to a further feature of the invention, the load support surface is defined by a tiltable tray and each trolley car includes a pivot shaft which rotates in response to tilting movement of the tray and the sensor means for detecting the position of the tray includes signal means operative to sense the angular position of the pivot shaft and thereby generate a tray position signal corresponding to the angular position of the pivot shaft. In the disclosed embodiment of the invention, the signal means comprises at least one magnetic member positioned on the pivot shaft and at least one switch member associated with the magnetic member and operative to sense the presence or absence of the magnetic member and thereby generate a present/absent digital signal representative of the angular position of the pivot shaft and thereby representative of the angular position of the tray.

According to a further feature of the invention, each trolley car includes shift means operative to move the tray between a generally level transport position, a first inclined loading position for discharge to one side of the rail, and a second oppositely inclined unloading position for discharge to the other side of the rail, and the shift means includes first and second cam tracks defined along the rail, first and second cam followers carried by the trolley car, and means operative in response to engagement of the first cam follower with the first track to move the tray to the first inclined unloading position and operative in response to engagement of the second cam follower with the second track to move the tray to the second inclined unloading position. This arrangement provides a simple and effective means for moving the tray between its various positions.

According to a further feature of the invention, the shift means further includes first and second solenoids carried by the trolley and operative to move the first and second cam followers into and out of a position where they engage a respective first and second track. This arrangement provides a simple and effective means of moving the cam followers into and out of operative relation to the respective tracks.

According to a further feature of the invention, the shift means further includes a pivot arm mounted on the trolley for pivotal movement about a generally horizontal pivot axis generally normal to the track, first and second follower arms pivotally mounted on the pivot arm for pivotal movement about a generally vertical pivot axis and each mounting a respective first and second follower, and a link structure connected at a lower end thereof to a free end of the pivot arm at a joint assembly and extending upwardly for connection to the tray. This specific structure provides a simple and effective means for moving the cam followers into and out of engagement with the respective tracks and converting cam follower engagement in a respective track into the desired tray movement.

According to a further feature of the invention, the shift means further includes latching means operative to latch the tray in its transport position upon arrival of the tray at its transport position and unlatching means operative to unlatch the tray as it begins its movement away from the transport position. This arrangement insures that the tray will not overshoot its transport position and yet may be moved readily to an inclined position.

In the disclosed embodiment of the invention, the latching means comprises a lug forming a part of the joint assembly coacting with a spring biased plunger structure to latch the lower end of the link structure and thereby the tray; the unlatching means comprises a pin and slot connection at the joint assembly; the pin has a circular cross-sectional configuration and the slot has a non-circular cross-sectional configuration defining diverging cam surfaces; and the pin coacts with a respective cam surface as the tray begins its movement away from the first or second inclined positions to pull the lug out of coaction with the plunger structure. This specific joint assembly assures firm latching of the tray in its transport position and further insures that the tray will be readily and positively unlatched when it is desired to move the tray out of its transport position.

According to a further feature of the invention the trolley car includes an indicator member movable between first and second positions in response to movement of the load support assembly of the trolley car between transport and discharge dispositions and signal means operative to sense the position of the indicator member and thereby of the load support assembly and generate a load support assembly disposition signal. In the disclosed embodiment of the invention the indicator means comprises a shaft pivotal between first and second angular positions in response to movement of the load support assembly between its transport and discharge dispositions and the signal means comprises at least one magnetic member positioned on the shaft and at least one switch member associated with the magnetic member and operative to sense the presence or absence of the magnetic member and thereby generate a presence/absent digital signal representative of the angular position of the shaft and thereby representative of the disposition of the load support assembly.

DETAILED DESCRIPTION OF THE PREFERRED EMBODIMENT

Figure 1:
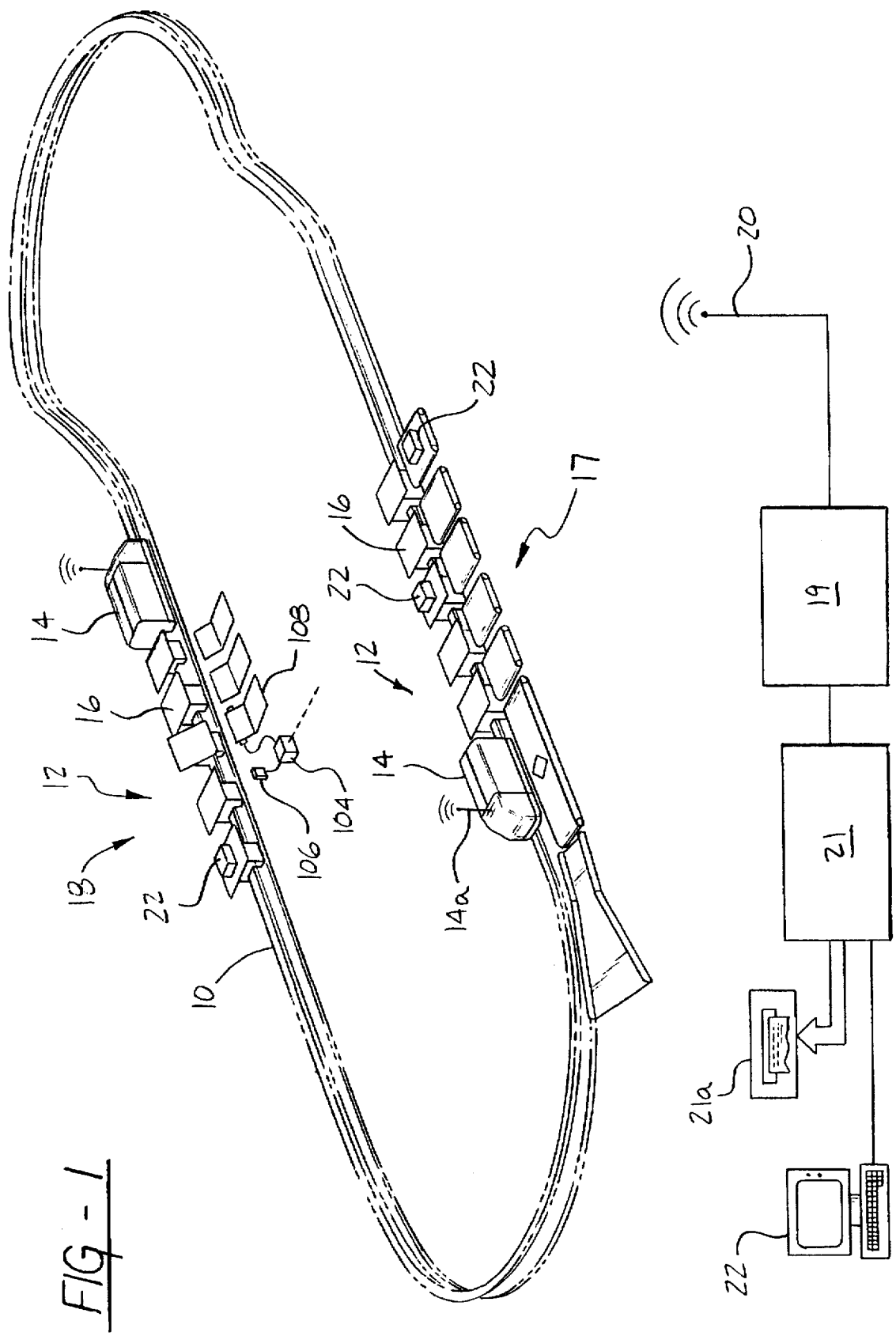
FIG. 1 is a perspective view of a material handling system according to the invention.

The material handling system seen in the drawings includes a rail 10 arranged in a desired predetermined configuration such for example as the closed loop seen in FIG. 1; one or more trains 12 arranged to run on the rail and each including a locomotive 14 pulling a plurality of trolley cars 16; at least one load station 17 and one unload station 18; a central dispatch CPU 19 located proximate but removed from the rail and communicating with a radio frequency transmitter/receiver 20; an information CPU 21 communicating with dispatch CPU 19 and including a printer 21a; and an input terminal 22.

Figure 2:
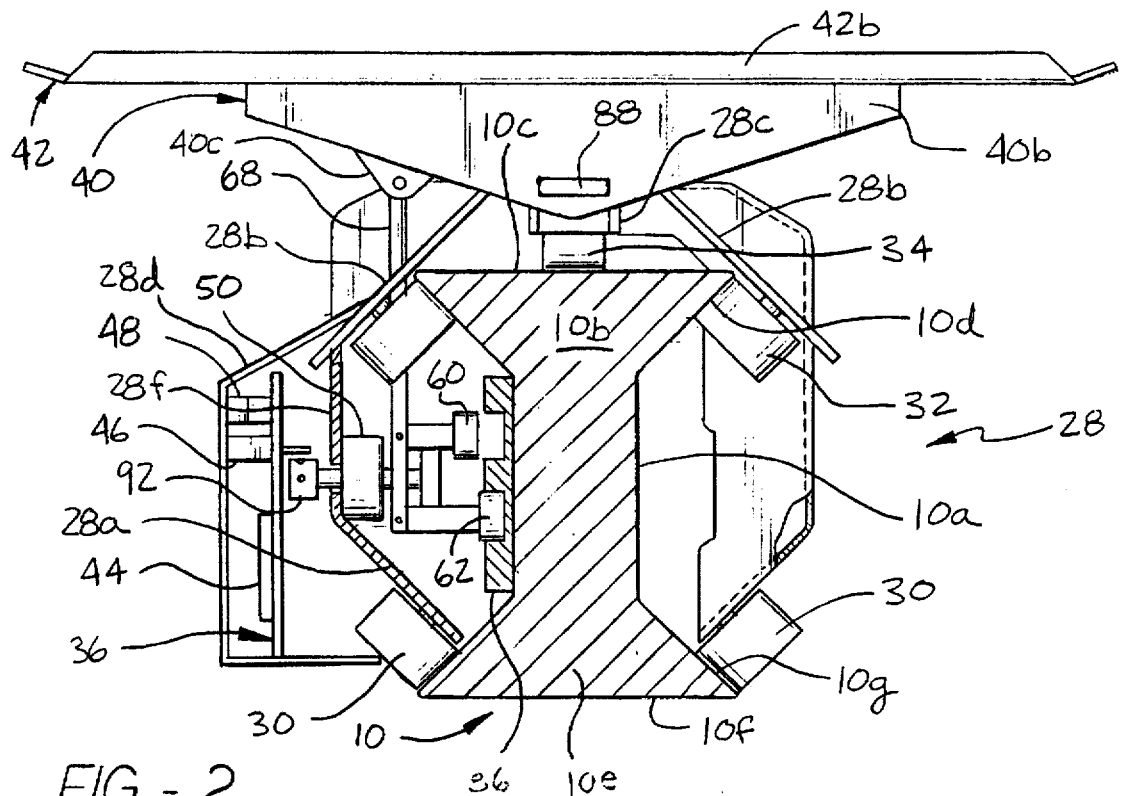
FIG. 2 is an end view of a trolley car utilized in the invention.

It will be understood that trains 12 move along rail 10 under the control of dispatch CPU 19 and selectively receive discrete products 22 at a load station 17, transport the products to an unload station 18, and discharge the products at the unload station. Rail 10 may take various forms and may, as best seen in FIG. 2, have an I configuration including a central upstanding web 10a; an upper triangular portion 10b defining a flat upper traction and support surface 10c and oppositely angled downwardly converging guide surfaces 10d; and a lower base portion 10e of triangular configuration including a lower support surface 10f and oppositely angled upwardly converging guide surfaces 10g.

This invention relates to improvements in the trolley car 16 and in the manner in which the trolley cars are integrated with the total material handling system to improve the overall efficiency and versatility of the system.

Each trolley car 16 includes a trolley and a load support or tray assembly.

The trolley includes a yoke frame structure 28, lower guide wheels 30, upper guide wheels 32, support wheels 34, a printed circuit board 36, and a tray shift mechanism.

Yoke frame structure 28 has an inverted U configuration and is arranged to be positioned in straddling relation over the rail.

Lower guide wheels 30 are mounted in angled relation on lower flange portions 28a of the yoke frame structure with each wheel rollably engaging a respective lower rail guide surface 10g. Upper guide wheels 32 are mounted on upper flange members 28b of the yoke frame structure and rollably engage respective upper rail guide surfaces 10d. For example, one centrally disposed lower guide wheel 30 may be provided at each side of the frame structure and two upper guide wheels 32 may be provided at each side of the frame structure.

Support wheels 34 are journalled in a spine structure 28c formed along the top of the yoke frame structure and rollably engage rail surface 10c to support the trolley on the rail. A front and rear support wheel 34 are preferably provided.

Printed circuit board 36 is positioned within a housing 28d forming a part of one side leg of the yoke frame structure and includes, inter alia, a CPU 44, an infrared transmitter 46, an infrared receiver 48, and related software. The free or operative ends of transmitter 46 and receiver 48 are positioned in suitable apertures in the outboard side wall 28e of housing 28d.

The tray shift mechanism (FIGS. 4, 5, 6, and 7) is intended to selectively shift tray assembly 26 between a level, a left inclined, and a right inclined position so as to facilitate loading, transport, and discharge of products 22. The shift mechanism includes a journal 50 (FIG. 2); a pivot shaft 52; a pivot arm 54; a pair of upper and lower follower arms 56, 58; a pair of upper and lower roller followers 60, 62 carried on the free ends of follower arms 56, 58; a pair of solenoids 64 mounted on the upper and lower ends of a cross bar 65 secured to pivot arm 54; a link 66; a link 68; and a latch mechanism 70 mounted on an end wall 28f of housing 28d.

Journal 50 is mounted on the inboard face of a vertical partition 28f forming a part of yoke frame structure 28.

Shaft 52 is journalled in journal 50 and extends inwardly from the journal. Pivot arm 54 is fixed to the inboard end of shaft 52 so as to turn with shaft 52 about a generally horizontal axis.

Follower arms 56, 58 are mounted for pivotal movement about a vertical axis defined by a pin 72 passing through the follower arm and through pivot arm 54 and including a threaded central portion passing threadably through shaft 52.

Cam follower 60 comprises a roller rollably mounted at one end 56a of follower arm 56 and cam follower 62 comprises a roller mounted on one end of follower arm 58. The plungers of solenoids 64 pivotally engage the other ends 56b, 58b of the follower arms so that the follower arms are pivoted about the axis of pins 72 in response to selective actuation of the respective solenoids with the extent of pivotal movement of the follower arm in each case being limited by a loop member 74 carried on one end 54a of arm 54. The other end 54b of arm 54 has a clevis formation (FIG. 7) including fork arm portions 54c. A pin 76 extends fixedly between fork portions 54b and a spring loaded pin 78 is mounted on the main body of pivot arm 54 and extends into the gap 80 between fork portions 54b.

Figure 3:
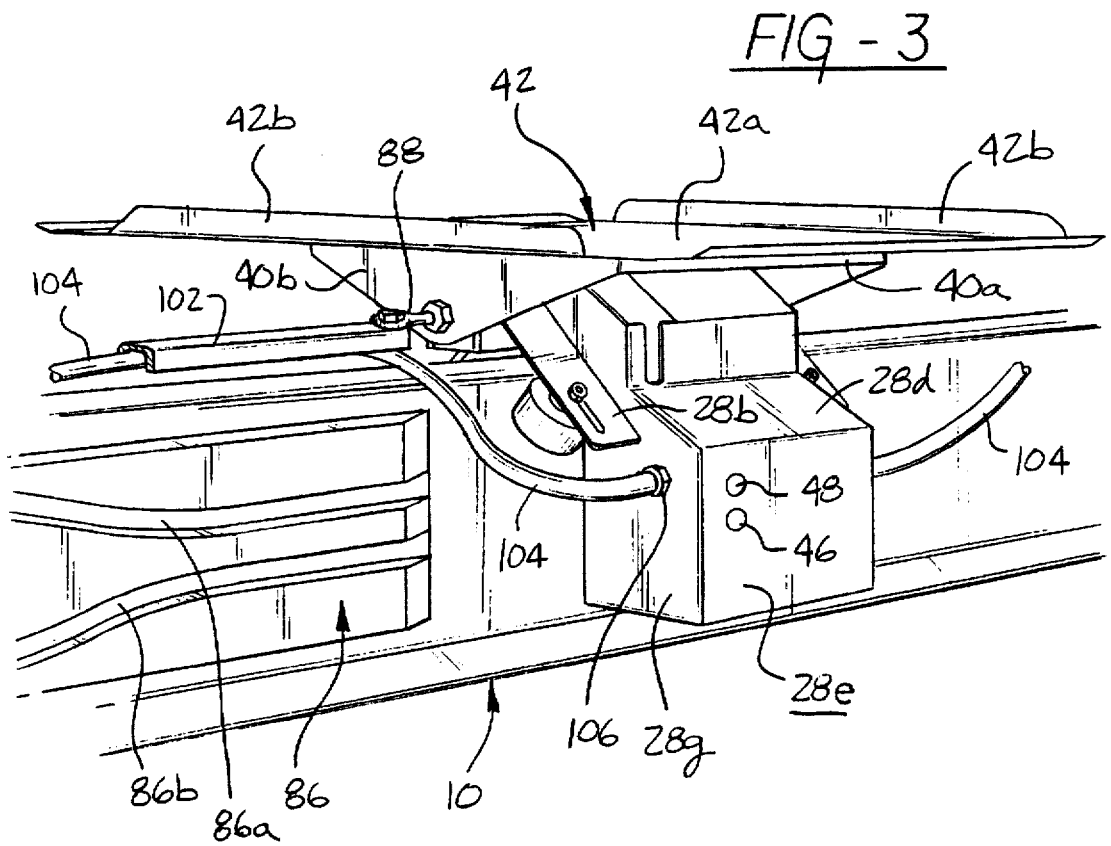
FIG. 3 is a perspective view of the trolley car.

The lower end of link 66 includes a heart-shaped slot 82 through which pin 76 passes. Slot 82 defines a central rest portion 82a and diverging cam surfaces 82b, 82c. The lower end of link 66 further defines a lug 66a arranged for latching coaction with a pair of spring biased plungers 84 defined by latch mechanism 70. Link 68 is pivotally secured to the upper end of link 66 by a pin 86 and extends upwardly for connection to the tray assembly. The tray shift mechanism is arranged for camming coaction with a cam plate 86 (FIG. 3) secured to a side face of the central web 10a of the track 10 and defining a pair of diverging tracks 86a and 86b for respective coaction with cam followers 60 and 62 to selectively shift the tray structure between level, left tilt, and right tilt positions.

Figure 8:
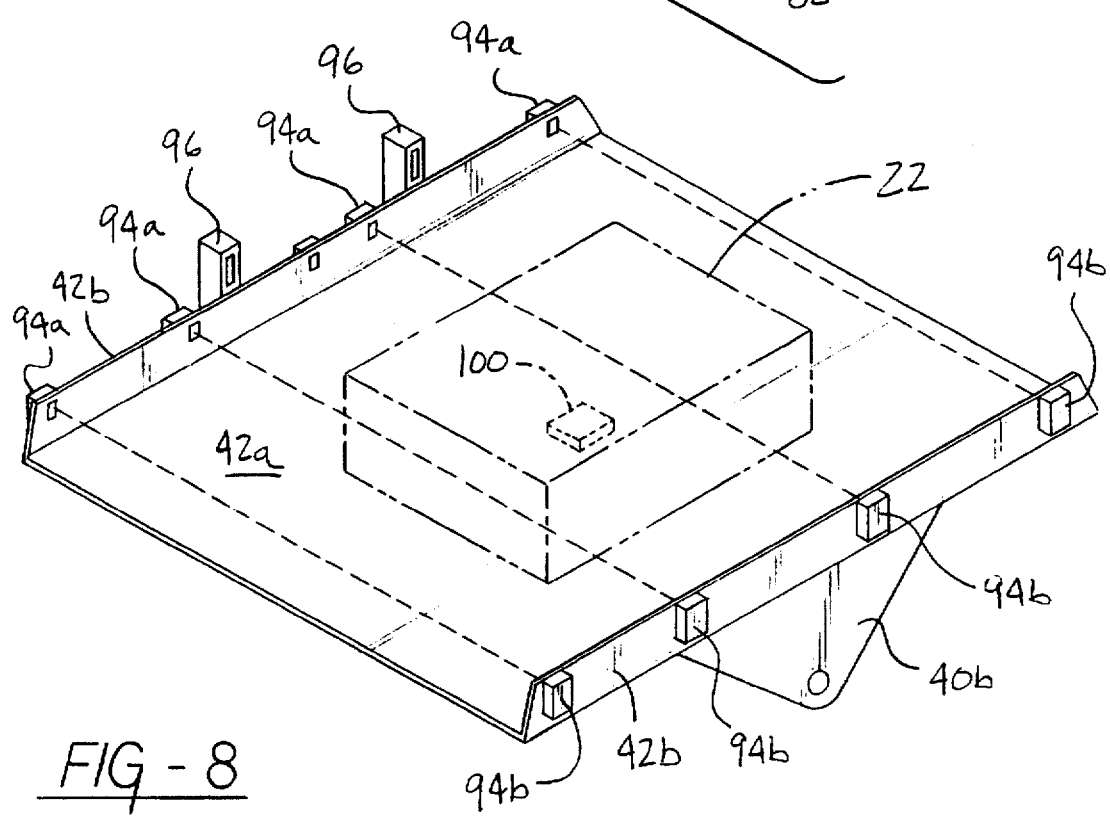
FIG. 8 is a perspective, somewhat schematic view of a trolley car tray illustrating various load sensing devices.

The load support or tray assembly (FIGS. 2, 3, and 8) includes a tray support 40 and a tray 42.

Tray support 40 includes a main body support portion 40a and triangular flange portions 40b at each end of the support. Tray support 40 is pivotally mounted to the trolley by clevis pins 88 mounted at each end of the yoke frame spine structure 28c. The tray support is thus mounted for pivotal movement about a horizontal axis extending along the track.

Tray 42 is suitably secured to the base 40a of tray support 40 and includes a flat floor 42a and front and rear upstanding flanges 42b. Floor 42a will be seen to define a load support surface for use in receiving, transporting, and discharging discrete products being handled by the material handling system.

The upper end of link 68 is suitably pivotally secured to a downstanding lug portion 40c of the tray support 40 so that upward and downward movement of the link 68 in response to actuation of the tray shift mechanism results in pivotal movement of the tray assembly 26 about the axis of clevis pins 88 between a relatively level or flat position, a left inclined position, and a right inclined position.

Figure 4:
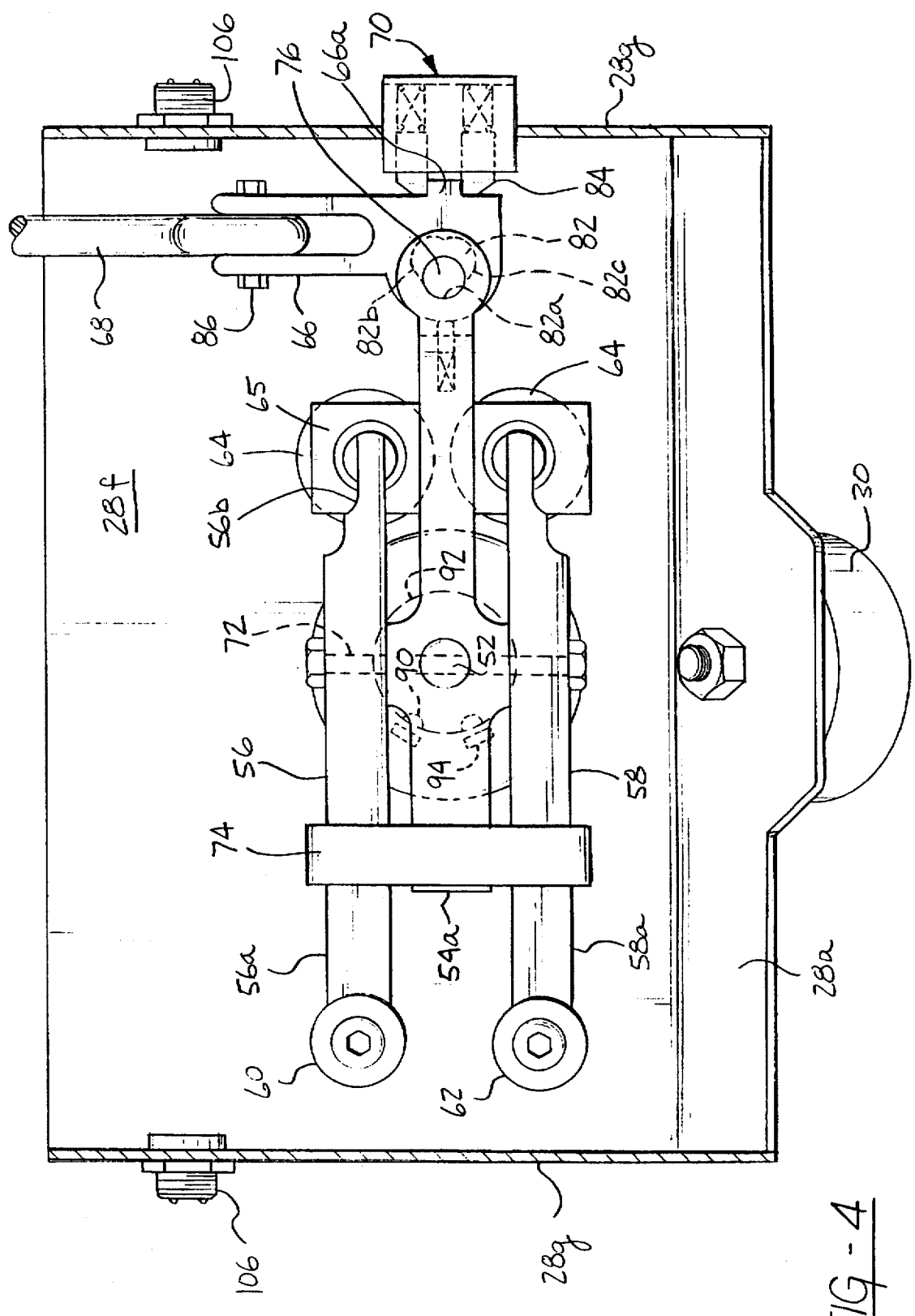
FIGS. 4, 5, and 6 are fragmentary views showing the operation of a tray shift mechanism for the trolley car.
Figure 5:
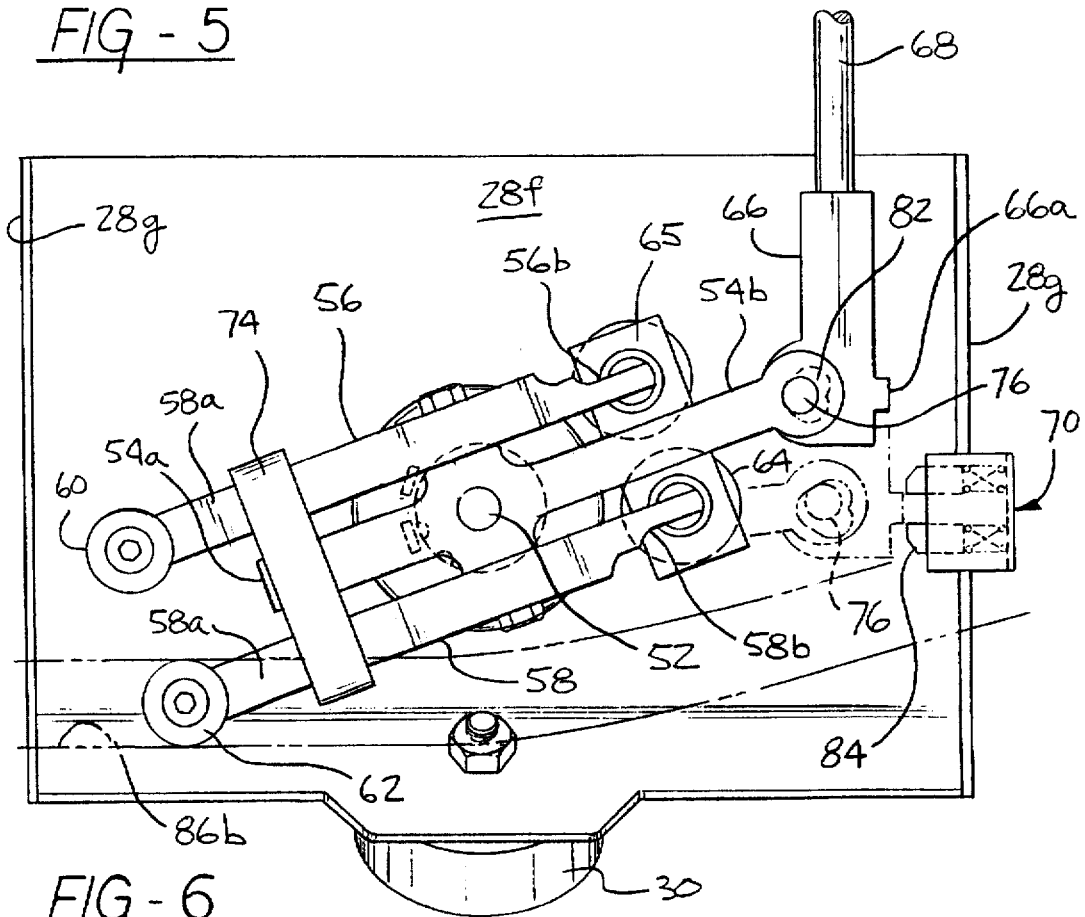
Figure 6:
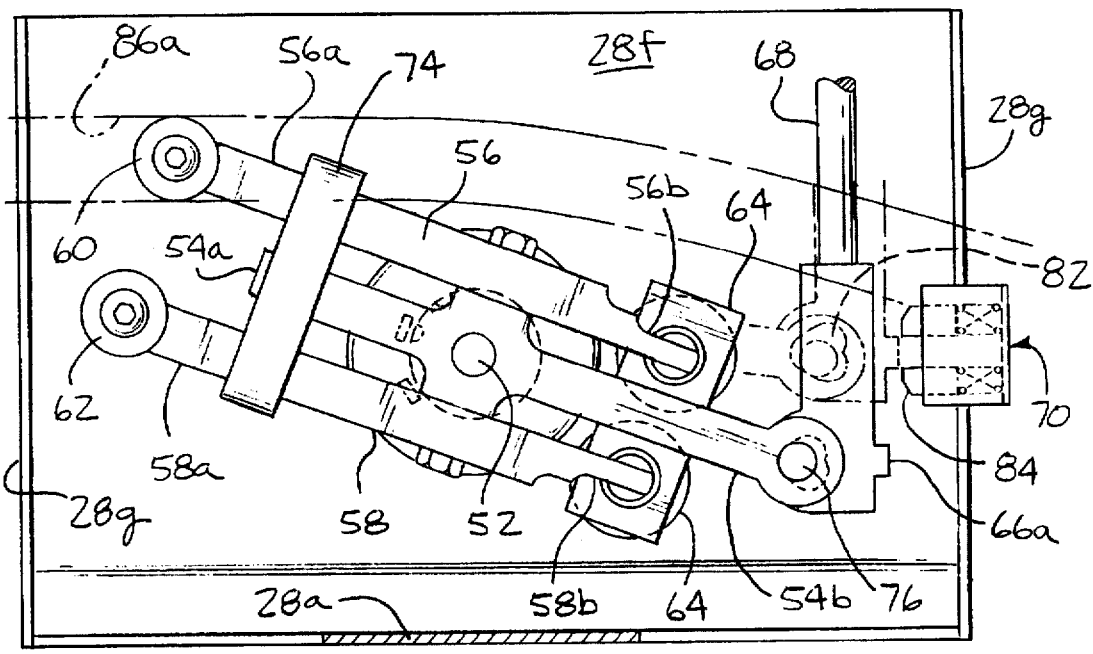
Figure 7:
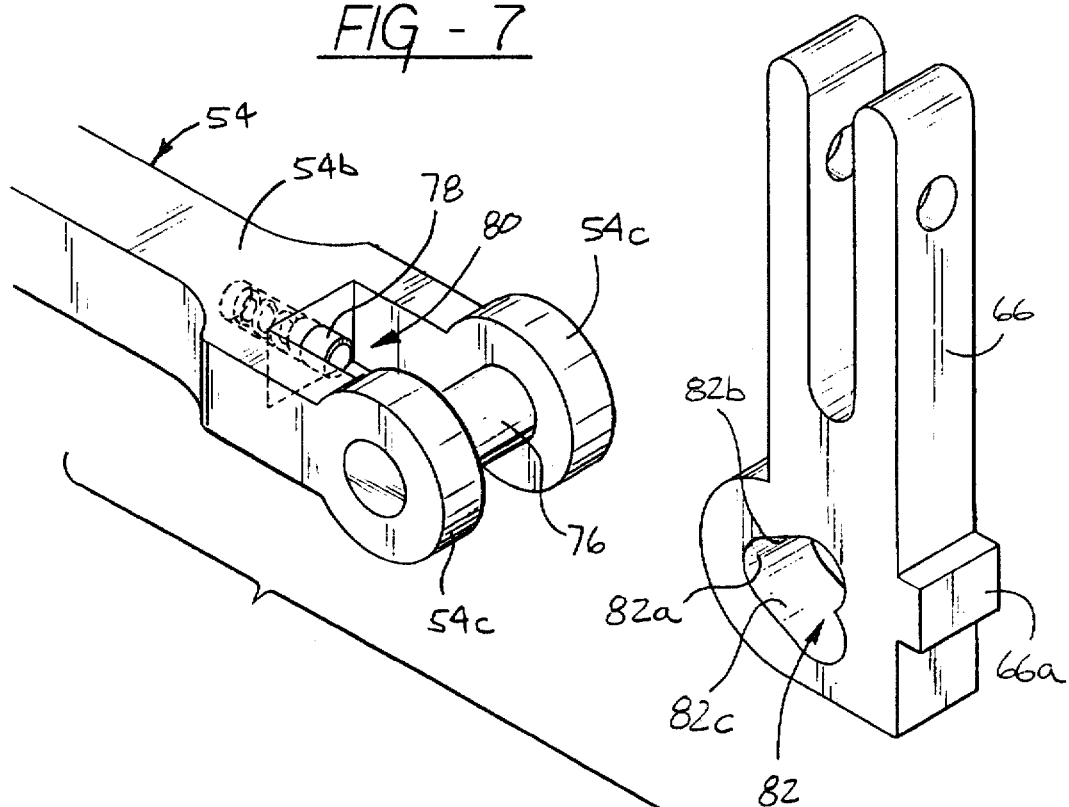
FIG. 7 is a perspective, exploded view showing details of the tray shift mechanism.

The tilt position of the tray assembly is constantly sensed as a function of the position of pivot shaft 52 since pivot shaft 52 pivots in correspondence with the pivoting movement of the tray assembly. Specifically, magnetic members 90 positioned at angularly spaced locations on a hub 92 secured to the free end of the shaft 52 coact with Hall Effect switches 94 which are suitably connected to circuit board 36 and which are suitably integrated into the circuitry of the circuit board. One magnetic member 90 is associated with each Hall Effect switch member 94 so that, as the shaft 52 rotates in response to shifting movement of the tray, the individual Hall Effect switch members 94 will constantly reflect the presence or absence of an associated magnetic member 90 and thereby generate a present/absent digital signal representative of the angular position of the shaft and thereby representative of the angular position of the tray assembly. A comparison of FIGS. 4, 5, and 6 shows the relative positioning of the Hall Effect switch members and the magnetic members as the tray assembly moves between its tilt positions.

Further sensor means are provided on the tray to sense various characteristics of the product 22 being handled by the material handling system. Specifically, each tray assembly may include one or more photo-eye transmitter assemblies 94a, 94b positioned along the respective flanges 42b of the tray; one or more load ID code readers 96 positioned along a flange of the tray; and one or more load temperature sensors 98 positioned along a flange of the tray. The photo-eye transmitters 94 function to detect the presence or absence of a product 22 on the tray and/or the size of the product (as a function of the number of photo-eye transmitters intercepted). Transmitters 94 also function to detect the orientation of the load, for proper processing, and detect movement of the load during transport. Load ID code readers 96 function to read the bar code or color code and thereby identify the particular product 22 positioned on the tray. Load temperature sensor 98 functions to determine the temperature of the product 22 positioned on the tray. The tray also desirably includes a sensor for determining the weight of the product 22 comprised, for example, of a load cell 100 positioned beneath the main body 42a of the tray so as to sense the added load of the product 22 as it is placed upon the tray. The information sensed or generated by the respective sensors is suitably transmitted to the circuit board 36 of the respective trolley car for processing and storage by CPU 44. These sensors in combination therefor provide to the CPU 44 information with respect to the presence of the product, the size of the product, the identity of the product, the temperature of the product, and the weight of the product.

The individual trolley cars 16 are interconnected for pulling purposes by links 102 extending between the front clevis 88 of one trolley car and the rear clevis 88 of the preceding car, and the successive cars are connected electrically by a cable 104 connected with the circuit board 36 of a respective car via a connector 106 positioned in the side wall 28g of the housing 28d containing the circuit board and extending forwardly therefrom for suitable connection to a similar connector 106 positioned in the side wall 28g of the housing 28d containing the circuit board of the preceding car. The circuit board 36 of each trolley car is suitably electrically connected to connectors 106 in the front and rear walls 28g of the respective housing 28d so that the circuit boards 36 are electrically connected in a continuous chain. Cables 104 are preferably routed through the links 102 which for that purpose have an inverted U-shaped configuration to provide a hollow through which the cables may be routed. The first car in the train is of course mechanically linked to the locomotive 14 and includes a cable 104 extending forwardly from that car for connection to the electrical system of the locomotive and specifically for connection to a CPU 107 positioned in the locomotive 14 and communicating by radio frequency via a locomotive antenna 14a with the transmitter/receiver 20 of dispatch CPU 19.

Figure 9:
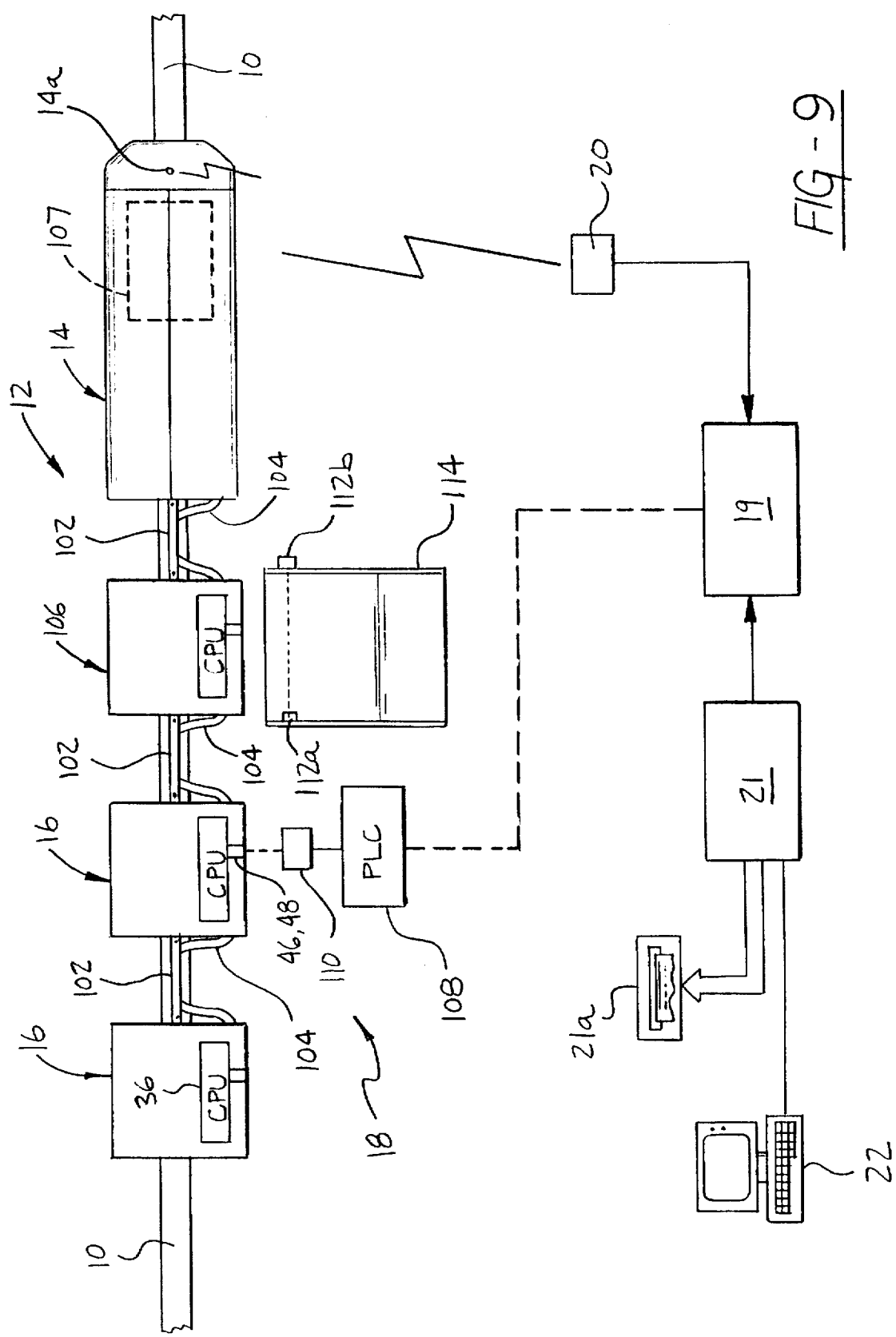
FIG. 9 is a circuit diagram of the material handling system of the invention.

With reference to the circuit diagram of FIG. 9, the system may further include one or more local CPUs 108 positioned proximate the unload station 18 and arranged to communicate with the infrared receiver 48 of a specific trolley car 16 via an infrared transmitter 110. Local CPU 108 may, for example, utilize a photo cell assembly 112a, 112b positioned in association with a discharge chute 114 at the unload station to ascertain the full/not full status of the chute with respect to product capacity and relay this information via transmitter 110 and receiver 48 to an approaching trolley car 16. Local CPU 108 may also be connected to dispatch CPU 19 so as to receive further system information from the dispatch CPU for transmittal to each trolley car 16 via the transmitter 110 and receiver 48.

Operation

Trains 12 desirably operate on a relatively continuous basis along the path determined by rail 10 to continuously pick up products 22 from load stations, transport the products to unload stations and discharge the products at the unload stations. As the trains proceed around the rail, they are controlled by a combination of information provided by dispatch CPU 19, locomotive CPU 107, local CPUs 108, and onboard circuit boards 36. Specifically, the dispatch CPU dispatches information with respect to the scheduling of the cars, the content of the cars of each train and the destination of each train. As the product is loaded onto or discharged from the tray of each trolley car, sensors 94, 96, 98, and 100 operate to generate information with respect to the presence of the load, the size, position and orientation of the load, the identification of the load, the temperature of the load, and the weight of the load, and relay this information to the onboard computer 44. This information is stored in the onboard computer 44 and is also transmitted via the series of cables 104 to locomotive computer 107 where the information is stored and also communicated by radio frequency, utilizing antenna 14a and transmitter receiver 20, to dispatch CPU 19 for use by the dispatch CPU in controlling the overall operation of the system.

The information provided to the onboard CPUs by the onboard sensors, in addition to being forwarded to the locomotive CPU and thereby to the dispatch CPU, is also used onboard as a double check on commands received from the locomotive CPU. For example, if the locomotive CPU relays a command to a particular trolley car CPU ordering the tray of that car to tip right as the car approaches an unloading chute but the trolley car by virtue of its onboard information knows that it is not carrying a load, it will countermand the command from the locomotive. As a further example, if the locomotive provides a tip right command to the car as the car approaches an unloading chute but the local CPU 108 provides information to the receiver 48 of the car via infrared transmission that the chute is full, the car will again countermand the command from the locomotive CPU.

The overall system thus has multiple redundancy in the sense that each trolley car can check on the commands given to it from the locomotive CPU by comparing these commands to information that has been sensed onboard by the onboard sensors and stored in the onboard CPU and can also check the commands from the locomotive CPU against information received from local CPUs at the unloading and/or loading stations. In this way the system provides multiple fail-safe protection with the system constantly checking itself for error and making decisions only when the multiple items of information being received are in agreement.

The tipping of the trays of the various trolley cars is controlled by the tray shift mechanism on each car acting in coaction with a cam plate 86. Specifically, as a car carrying a product approaches an unloading chute on the right hand side of the car, and assuming that all of the redundant checks provided by the system indicate that the trolley is in fact carrying the proper cargo and that the chute has the capacity to receive the trolley cargo, an appropriate signal is sent by the locomotive CPU 107 to the appropriate solenoid 64 to actuate the solenoid in a sense to move the associated follower arm 56, 58 about the axis of pin 52 to move the associated cam follower roller 60, 62 into a position where it will engage the respective track 86a, 86b of the cam plate 86 as the trolley car approaches the unloading chute so that the shift mechanism may function to pivot the tray either to its left or its right inclined position, depending upon the location of the unloading chute, with the movement of the tray occurring as pivotal movement of the lever 54 and upward or downward movement of links 66, 68. When it is desired to return the tray to the level or neutral position, an appropriate cam plate 86 defining cam tracks that are the reverse of tracks 86a, 86b is utilized in coaction with the appropriate solenoid.

As the tray reassumes its level or neutral position, lug 66a on the lower end of link 66 cammingly biases a respective spring biased plunger 84 inwardly and thereafter moves into a position of locking interengagement with the upper and lower plungers so as to avoid overshoot of the tray assembly as it arrives at its level position. The shift mechanism configuration corresponding to one of the inclined positions of the tray is seen in FIG. 5, the shift mechanism configuration corresponding to the other inclined position of the tray is seen in FIG. 6, and the shift mechanism configuration corresponding to the level or neutral position of the tray is seen in FIG. 4. It will be seen that in any of these positions, the pin 76 occupies the bottom or left lobe portion 82a of the heart-shaped slot 82 by virtue of the spring bias pin 78 acting against the far end of link 64 and pushing the link to the right to move pin 76 into engagement with the left or bottom lobe of the heart-shaped slot.

When it is desired to move the tray to an inclined position, the suitable solenoid 60 is actuated and the initial portion of the angular movement of pivot arm 54 results in the pin 76 walking up or down a respective cam surface 82b or 82c defined by the cam shaped slot with the result that the link 66 and thereby the lug 66a is pulled to the left out of engagement with the plungers 84 to allow the shift mechanism to continue its movement to the desired inclined position, whereupon pin 76 will again assume a position seated in the left or bottom lobe portion 82a of the slot. The described arrangement thus ensures that the tray will be firmly latched in the neutral or level position and yet may be readily moved out of the latched configuration when the time comes to move the tray to a tilted position.

The invention will be seen to provide an improved train-type material handling system in which each individual trolley car of the train has the onboard ability to receive and disseminate load and system information in a manner to improve the overall efficiency and effectiveness of the system as compared to train type systems in which the trolley cars are totally dependent on external sources for their status.

Whereas a preferred embodiment of the invention has been illustrated and described in detail, it will be apparent that various changes may be made in the disclosed embodiment without departing from the scope or spirit of the invention.

We claim:

1. A material handling system including:

a rail;

a locomotive mounted for powered movement along the rail;

one or more trolley cars arranged to be pulled along the rail by the locomotive and each including an upper load support surface for use in selectively receiving, transporting, and discharging discrete products with respect to various stations along the rail;

a CPU; and sensor means on each car operative to sense information with respect to the products on the load support surface of that car and transmit the sensed information to the CPU for storage and utilization by the CPU in controlling the load support surface in a manner to facilitate the receipt, transport and discharge of the products.

2. A material handling system according to claim 1 wherein:

each trolley car includes a CPU; and the information sensed with respect to the product on the load support surface of each car is transmitted to the CPU of that car.

3. A material handling system according to claim 2 wherein:

the locomotive includes a CPU; and the sensed information stored in each trolley car CPU is transmitted to the locomotive CPU for storage and utilization by the locomotive CPU in the receipt, transport and discharge of the products.

4. A material handling system according to claim 3 wherein:

the system further includes a central dispatch CPU located off track and controlling the overall operation of the material handling system; and the locomotive CPU communicates with the dispatch CPU and operates to transmit information received from the trolley CPU to the dispatch CPU for utilization by the dispatch CPU in controlling the overall operation of the material handling system.

5. A material handling system according to claim 4 wherein the communication between the locomotive CPU and the dispatch CPU is by radio frequency.

6. A material handling system according to claim 2 wherein the system further includes an off-track CPU and means operative to allow communication directly between the off-track CPU and the trolley car CPU.

7. A material handling system according to claim 6 wherein the means allowing communication comprises means allowing infrared communication between the off-track CPU and the trolley car CPU.

8. A material handling system according to claim 1 wherein the load support surface is defined by a tiltable tray and the information sensed by the sensor means includes information with respect to the position of the tray.

9. A material handling system according to claim 1 wherein the information sensed by the sensor means includes information with respect to the presence or absence of a product load on the load support surface.

10. A material handling system according to claim 1 wherein the information sensed by the sensor means includes information with respect to the size, position or orientation of a product load on the load support surface.

11. A material handling system according to claim 1 wherein the information sensed by the sensor means includes information with respect to the weight of a product load on the load support surface.

12. A material handling system according to claim 1 wherein the information sensed by the sensor means includes information with respect to the identification of a product load on the load support surface.

13. A material handling system according to claim 1 wherein the information sensed by the sensor means includes information with respect to the temperature of a product load on the load support surface.

14. A material handling system according to claim 11 wherein the sensor means comprises a strain gauge positioned proximate the load support surface.

15. A material handling system according to claim 8 wherein:
each trolley car includes a pivot shaft which rotates in response to tilting movement of the tray; and
the sensor means includes signal means operative to sense the angular position of the pivot shaft and thereby generate a tray position signal corresponding to the angular position of the pivot shaft.

16. A material handling system according to claim 15 wherein the signal means comprises at least one magnetic member positioned on the pivot shaft and at least one switch member associated with the magnetic member and operative to sense the presence or absence of the magnetic member and thereby generate a present/absent digital signal representative of the angular position of the pivot shaft and thereby representative of the angular position of the tray.

17. A material handling system according to claim 8 wherein the sensor means comprises a photocell assembly positioned on the load support surface.

18. A material handling system according to claim 12 wherein the sensor means comprises a bar code reader positioned on the load support surface.

19. A material handling system including a rail; a trolley car including a trolley adapted to move along the rail and a tray mounted on the trolley; and shift means operative to move the tray between a generally level transport position, a first inclined unloading position for discharge to one side of the rail, and a second oppositely inclined unloading position for discharge to the other side of the rail, characterized in that:
the shift means includes first and second cam tracks defined along the rail, first and second cam followers carried by the trolley car, and means operative in response to engagement of the first cam follower with the first track to move the tray to the first inclined unloading position and operative in response to engagement of the second cam follower with the second track to move the tray to the second inclined unloading position.

20. A material handling system according to claim 19 wherein the shift means further includes first and second solenoids carried by the trolley and operative to move the first and second cam followers into and out of a position where they engage a respective first and second track.

21. A material handling system according to claim 19 wherein the shift means further includes a pivot arm mounted on the trolley for pivotal movement about a generally horizontal pivot axis generally normal to the track, first and second follower arms pivotally mounted on the pivot arm for pivotal movement about a generally vertical pivot axis and each mounting a respective first and second follower, and a link structure connected at a lower end thereof to a free end of the pivot arm at a joint assembly and extending upwardly for connection to the tray.

22. A material handling system according to claim 21 wherein the shift means further includes latching means operative to latch the tray in its transport position upon arrival of the tray at its transport position and unlatching means operative to unlatch the tray as it begins its movement away from its transport position.

23. A material handling system according to claim 22 wherein the joint assembly defines the latching means and the unlatching means.

24. A material handling system according to claim 23 wherein the latching means comprises a lug forming a part of the joint assembly coacting with a spring-biased plunger structure to latch the lower end of the link structure and thereby the tray.

25. A material handling system according to claim 23 wherein the unlatching means comprises a pin and slot connection at the joint assembly.

26. A material handling system according to claim 25 wherein:
the pin has a circular cross-sectional configuration and the slot has a non-circular cross-sectional configuration defining diverging cam surfaces; and
the pin coacts with a respective cam surface as the tray begins its movement away from its transport position to pull the lug out of coaction with the plunger structure.

27. A material handling system according to claim 26 wherein:
the generally horizontal pivot axis comprised a pivot shaft; and
the material handling system further includes signal means operative to sense the angular position of the pivot shaft and generate a tray position signal corresponding to the angular position of the pivot shaft.

28. A material handling system according to claim 27 wherein the signal means comprises a plurality of magnetic members positioned on the pivot shaft at angularly spaced locations and a plurality of switch members respectively associated with the magnetic members and each operative to sense the presence or absence of a magnetic member and thereby generate a present/absent digital signal representative of the angular position of the pivot shaft and thereby representative of the angular position of the tray.

29. A trolley car for a material handling train including a trolley adapted to move along a rail, a load support assembly on the trolley, shift means operative to move the load support assembly between a transport disposition and a discharge disposition and means for indicating the disposition of the load support assembly, characterized in that:
the disposition indicating means comprises an indicator member on the trolley car moveable between first and second positions in response to movement of the load support assembly between its transport and discharge dispositions and signal means operative to sense the position of the indicator member, and thereby the disposition of the load support assembly, and generate a load support assembly disposition signal.

30. A trolley car according to claim 29 wherein the indicator member comprises a shaft pivotable between first and second angular positions in response to movement of the load support assembly between its transport and discharge dispositions.

31. A trolley car according to claim 30 wherein:

the signal means comprises at least one magnetic member positioned on the shaft and at least one switch member associated with the magnetic member and operative to sense the presence or absence of the magnetic member and thereby generate a present/absent digital signal representative of the angular position of the shaft and thereby representative of the disposition of the load support assembly.

32. A trolley car according to claim 31 wherein the signal means comprises a plurality of magnetic members positioned on the shaft at angularly spaced locations and a plurality of switch members respectively associated with the magnetic members and each operative to sense the presence or absence of the magnetic member and thereby generate a present/absent digital signal representative of the angular position of the shaft and thereby representative of the disposition of the load support assembly.

* * * * *